United States Patent
West et al.

(10) Patent No.: US 12,406,508 B2
(45) Date of Patent: Sep. 2, 2025

(54) AUTOMATED ROBOTIC GROUND-TRUTH, CHECKLISTS, AND PHYSICAL TRACEABILITY

(71) Applicant: Haystack Robotics, Inc., Portland, OR (US)

(72) Inventors: Paul R. West, Portland, OR (US); Mahadev Eakambaram, Portland, OR (US)

(73) Assignee: HAYSTACK ROBOTICS, INC., Portland, OR (US)

( * ) Notice: Subject to any disclaimer, the term of this patent is extended or adjusted under 35 U.S.C. 154(b) by 327 days.

(21) Appl. No.: 18/139,874

(22) Filed: Apr. 26, 2023

(65) Prior Publication Data
US 2024/0078812 A1    Mar. 7, 2024

Related U.S. Application Data

(60) Provisional application No. 63/334,947, filed on Apr. 26, 2022.

(51) Int. Cl.
*G06V 20/58*    (2022.01)
*G06T 7/70*    (2017.01)
*G06T 11/20*    (2006.01)

(52) U.S. Cl.
CPC ............... *G06V 20/58* (2022.01); *G06T 7/70* (2017.01); *G06T 11/206* (2013.01); *G06T 2200/24* (2013.01); *G06T 2207/30261* (2013.01)

(58) Field of Classification Search
CPC .......... G06T 7/70; G06T 11/206; G06V 20/58
See application file for complete search history.

(56) References Cited

U.S. PATENT DOCUMENTS

| | | | |
|---|---|---|---|
| 2012/0095619 A1* | 4/2012 | Pack | G05D 1/0016 701/2 |
| 2017/0039859 A1* | 2/2017 | Hu | G08G 5/57 |

(Continued)

FOREIGN PATENT DOCUMENTS

| | | |
|---|---|---|
| CN | 111680915 A | 9/2020 |
| JP | 2007111854 A | 5/2007 |

(Continued)

OTHER PUBLICATIONS

International Search Report and Written Opinion mailed Aug. 2, 2023, Patent Application No. PCT/US2023/066262, 9 pages.

*Primary Examiner* — Seth A Silverman
(74) *Attorney, Agent, or Firm* — McCoy Russell LLP

(57) ABSTRACT

Systems and methods are described for detecting and identifying discrepancies of states of objects and/or areas of interest in a space. In some aspects, an autonomous device may collect ground truth data of a space including information identifying objects each associated with a location in the space, and a condition associated with at least some of the objects. A checklist including a set of desired states for at some of objects may be obtained and compared to the ground truth data to produce a set of comparisons, where individual comparisons identify discrepancies between the ground truth data of an object and the desired state of the object. The discrepancies may be compared to a criteria for correction, and upon at least one satisfying the criteria, a notification indicating the at least one discrepancy may generated and/or performance of a corrective action triggered.

20 Claims, 12 Drawing Sheets

(56) References Cited

U.S. PATENT DOCUMENTS

2018/0095450 A1* 4/2018 Lappas ................. B33Y 10/00
2019/0333359 A1   10/2019 Moroniti et al.
2020/0175714 A1* 6/2020 Hong .................. G06V 10/772

FOREIGN PATENT DOCUMENTS

| JP | 2020062691 A | 4/2020 |
| KR | 10-2018-0054505 A | 5/2018 |

* cited by examiner

| Labelled Object | X-Position | Y-Position | Z-Position | Condition | Timestamp |
|---|---|---|---|---|---|
| TV Remote | 10 | 2 | 3 | N/A | 10:01 (mm/dd/yyyy) |
| Pillow 1 | 12 | 9 | 3 | Clean | 10:02 (mm/dd/yyyy) |
| Pillow 2 | 13 | 9 | 3 | Dirty | 10:03 (mm/dd/yyyy) |
| Telephone | 10 | 1 | 3 | N/A | 10:04 (mm/dd/yyyy) |
| Towel 1 | 5 | 8 | 3 | Folded | 10:05 (mm/dd/yyyy) |
| Towel 2 | 5 | 9 | 3 | Un-folded | 10:06 (mm/dd/yyyy) |
| Lamp | 10 | 9 | 3 | N/A | 10:07 (mm/dd/yyyy) |
| Clock | 14 | 6 | 3 | Powered On | 10:08 (mm/dd/yyyy) |
| Fire Extinguisher | 6 | 1 | 3 | N/A | 10:09 (mm/dd/yyyy) |
| Television | 13 | 7 | 3 | N/A | 10:10 (mm/dd/yyyy) |
| Bathtub | 1 | 7 | 3 | N/A | 10:11 (mm/dd/yyyy) |
| Pillow 3 | 6 | 9 | 1 | Clean | 10:12 (mm/dd/yyyy) |

Distance Between Objects Table

AUTOMATED ROBOTIC GROUND-TRUTH, CHECKLISTS, AND PHYSICAL TRACEABILITY

CROSS-REFERENCE TO RELATED APPLICATIONS

This application claims the benefit of U.S. Provisional Patent Application No. 63/334,947, filed Apr. 26, 2022, the disclosure of which is incorporated herein by reference in its entirety.

BACKGROUND

Robotics have long been used for automating mundane tasks or jobs that would traditionally be done by a person. One mundane job that still requires a human is completing a checklist or inventory count of the status of items in a space, verifying the state of a space, or checking to see if objects in a space have changed or moved location. One example of these types of tasks may hotel rooms, where a manager is typically required to verify the condition of hotel rooms, including manually check the right number of pillows, towels, etc. are in the correct location, making sure the room is in proper condition (toilet seat down, closets empty, etc.). Another example may be in a retail environment, where a manager or human is still needed to check the inventory of merchandise. While often times these locations have an "expected" inventory or status, physical verification of the "ground truth" data is required for comparison or verification. Various other similar verification type tasks exist in many other scenarios and situations.

Jobs such as completing checklists are mundane, and in some cases can be dangerous. People typically do not enjoy doing these tasks, and filling these jobs is costly. Additionally, humans make mistakes (human error), making it more difficult to track the information over time. In view of the foregoing, a need exists for an improved method of collecting ground-truth data, automating checklist systems, and physical traceability methods for automating checklists in an effort to overcome the aforementioned obstacles and deficiencies of conventional inventory tracking systems.

BRIEF DESCRIPTION OF THE DRAWINGS

Various techniques will be described with reference to the drawings, in which:

FIG. 2 illustrates an example table of ground truth data, such as may be correspond to objects in the example map of FIG. 1, according to at least one embodiment;

FIG. 3 illustrates an example table of calculated distances between objects identified in the example map of FIG. 1, according to at least one embodiment;

DETAILED DESCRIPTION

Figure 1:
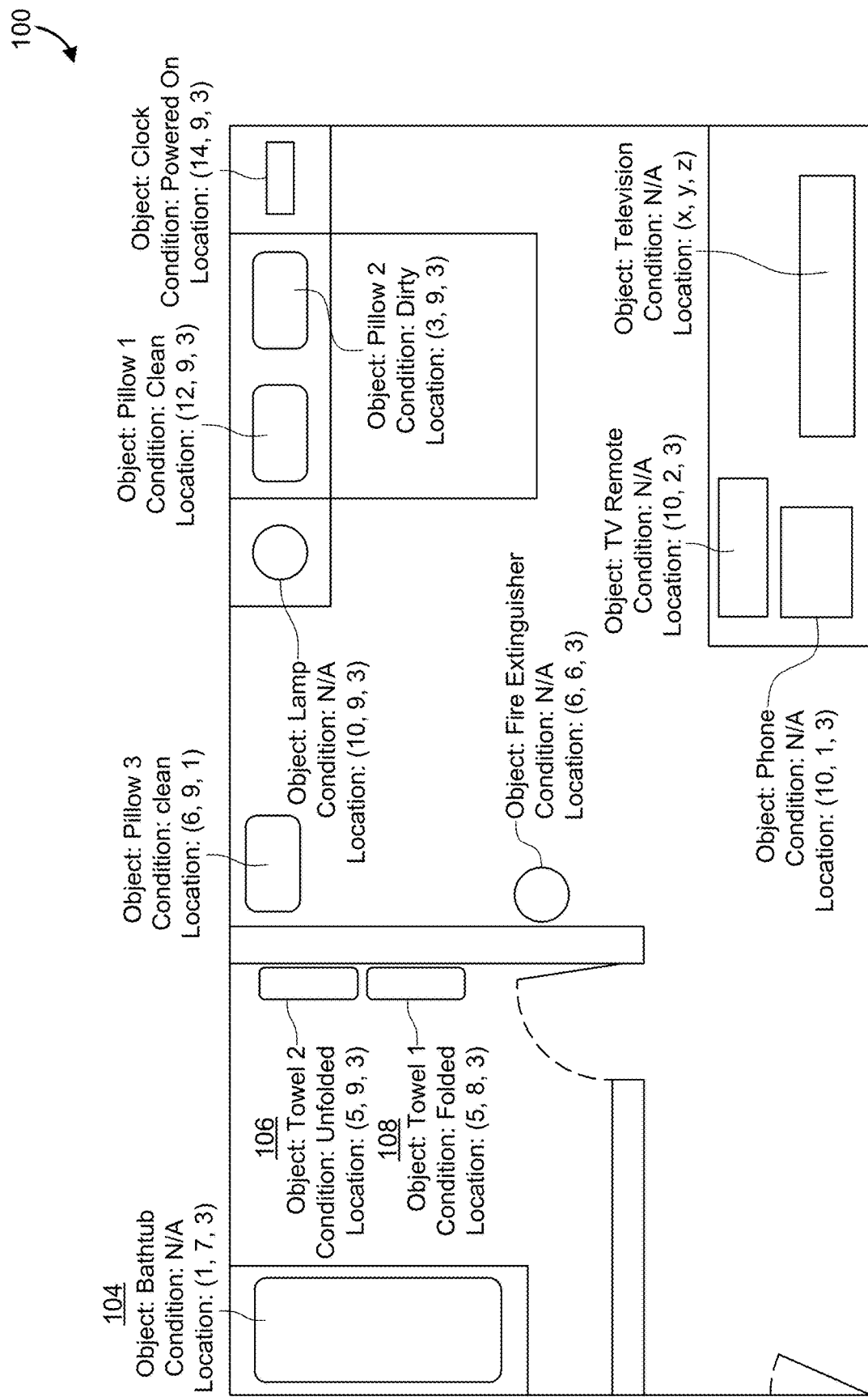
FIG. 1 illustrates an example of ground truth data including labeled objects represented in a map of an interior room, according to at least one embodiment.

Systems and methods are described herein relating to detecting and identifying discrepancies of states of objects and/or areas of interest in a space. In some aspects, an autonomous device or robot can navigate a room or space, and map the space, such as using any of a variety of simultaneous localization and mapping (SLAM) techniques. The autonomous device may identify various objects or areas of interest in the space and determine their location within the space (e.g., a relative location). In some aspect, the autonomous vehicle may also observe or detect one or more conditions associated with various objects or areas of interest (e.g., relating to cleanliness, shape, whether the object has power or is operating, etc.). As described herein, the state of an object or area of interest may generally include a location and/or more or more conditions associated with the object or area of interest. This observed data (e.g., referred to herein collectively as ground truth data) may be collected and stored in a data structure, such as a table. This ground truth data, such as including labelled objects, conditions, and locations, may then be compared to a set of desired states for at least some of the identified objects. The set of desired states may collectively be referred to as a checklist. In some cases, the current ground-truth data can additionally or alternatively be compared to historical ground-truth data to detect when objects are added, removed, changed condition, or changed location. Any differences (e.g., discrepancies) between the desired state and the ground truth can easily be identified and flagged.

In some cases, the flagged discrepancies can be compared to one or more criteria to determine if any action should be triggered to correct the discrepancy. In some aspects, triggering an action may include generating a notification in a graphical user interface, sending a message to a computing device, etc., to notify or correct the discrepancy.

With various embodiments discussed herein, the job of a person checking against a checklist can be automated. In some examples, people may not have to do the mundane job of checking objects on a list, can save them time and money, human errors can be avoided, and differences from the checklist can be easily identified and historically tracked.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) increased accuracy of verifications tasks using an autonomous device, (2) reducing human involvement in performing verification tasks, and (3) various other advantages as will be described and made apparent throughout the rest of the disclosure.

FIG. 1 illustrates an example of ground truth data including various labeled objects represented in a map 100 of an interior room 102. In some cases, a first step of the described techniques may include a robot or autonomous device exploring or traversing a space, such as a hotel room, store, warehouse, or various other indoor or outdoor spaces, and generating a map of part or all of the space using various suitable methods for mapping and navigation. In some aspects, the robot may utilize various SLAM techniques to generate a map of an area. While the robot is exploring the space, it can take input from sensors (including a 3D camera, lidar, sonar, etc.) and can run neural network algorithms to inference/recognize, and classify objects and conditions based on image recognition and identify their location in 3-Dimensional Space (X, Y, Z coordinates). If multiple objects of the same type are recognized, the autonomous device may associate a unique ID's (e.g., Pillow 1, Pillow 2, etc.) to the objects of the same type or with the same identifier to be able to reference the similar objects. In some aspects, if an object is not detected, in various embodiments, it is assumed to not be present in the room.

Objects in various examples can be inventory items (e.g., towels, pillows, etc.) that are recognized by any of a variety of object detection algorithms, such as may be known in the art. In some embodiments, an object is considered to be present if detected by the sensors and algorithms, or not present (missing) if not detected by the sensors and algorithms. The condition of the current state of objects can also be detected. For example, is the toilet seat up or down, the bed properly made, whether towels and pillows are clean or dirty, etc. The location of where the objects and conditions exist can also be monitored. The location in various examples includes both the objects physical location, as well as its proximity to other objects and/or conditions. An area of interest, as used herein may be any area, such as may contain one or more objects, or be devoid of identifiable objects. Areas of interest may include the space in front of an inventory shelf at a store or retail location, a space around a toilet or bathtub or bed in a hotel room, and so on. The described techniques may operate on objects, areas of interest, or a combination thereof.

As illustrated in FIG. 1, the autonomous device may detect a bathtub 104 at location 1, 7, 3 with no detected condition (either no condition was detected or no condition has been programmed for that type of object, towel 1 106, folded at position 5, 8, 3, and towel 2 108, unfolded at position 5, 9, 3 to name a few examples in a bathroom of a hotel room. In some cases, the autonomous device may identify other objects such as walls, doors, countertops, etc., using various techniques, such as those described in U.S. Non Provisional patent application Ser. No. 18/121,538, filed Mar. 14, 2023, titled "AUTOMATED ROBOTIC DISINFECTION SYSTEM AND METHOD," the contents of which are herby incorporated by reference in their entirety, which may not be used for state verification, as described herein. In some cases, some objects or other components of a space may be identified and removed from consideration for state verification, such as based on a configuration of what types of objects are of interest. Various other objects may be identified and their respective location and conditions recorded, such as may be discussed below in reference to FIG. 2

In some cases, the autonomous device may generate an actual map representation of the collected ground truth data, as illustrated in FIG. 1. In other cases, the autonomous vehicle may additionally or alternatively generate a table or other data structure of the gathered ground truth data, as represented by table 200 illustrated in FIG. 2. As illustrated in table 200, the table may include a number of rows 202 each corresponding to a detected object or area of interest. The example data in table 200 may include various objects 204 that may be found in a hotel room or other sleeping quarters. In other examples, the describe techniques may be useful for a number of other scenarios or situations with a variety of different objects/areas of interest. For example, in a store example, the objects may include items for sale, such as to verify inventory, where the conditions may include whether the item is contained in packaging or whether it has been damaged in some way. In other cases, the objects may include items in a hospital room, such as medical devices, beds, electronics, and so on.

As illustrated in table 200, the location information may include X and Y, and in some cases Z coordinates in an XYZ coordinate system, represented as columns 206, 208, 210. It should be appreciated, however, that other representations can be used with any of a variety of coordinate systems, such as may better suit the intended use case (e.g., excluding the Z coordinates in some examples). As also illustrated, at least some (e.g., a subset) of the objects may be associated with a condition 212, such as may be detected by the robot, such as may represent a variety of different attributes, such as clean or dirty, folded, unfolded, powered on or powered off, damaged, un damaged, packaged, loose, and so on. It should be appreciated that any type of condition that may be detected can be used advantageously using the described techniques. In some cases, the autonomous device may obtain and associate time stamp data 214 with various pieces (e.g., rows) or objects of the ground truth data. Also note that a condition is not required for all objects in some examples, and can be wildcarded (N/A). The timestamp data may include data of any of a configurable granularity (day, hour, minute, etc.). Various other types or categories may be stored in the data structure 200 forming ground truth data of a space, such as any data that may be useful to verify the state of objects, areas of interest, etc.

Figure 3:
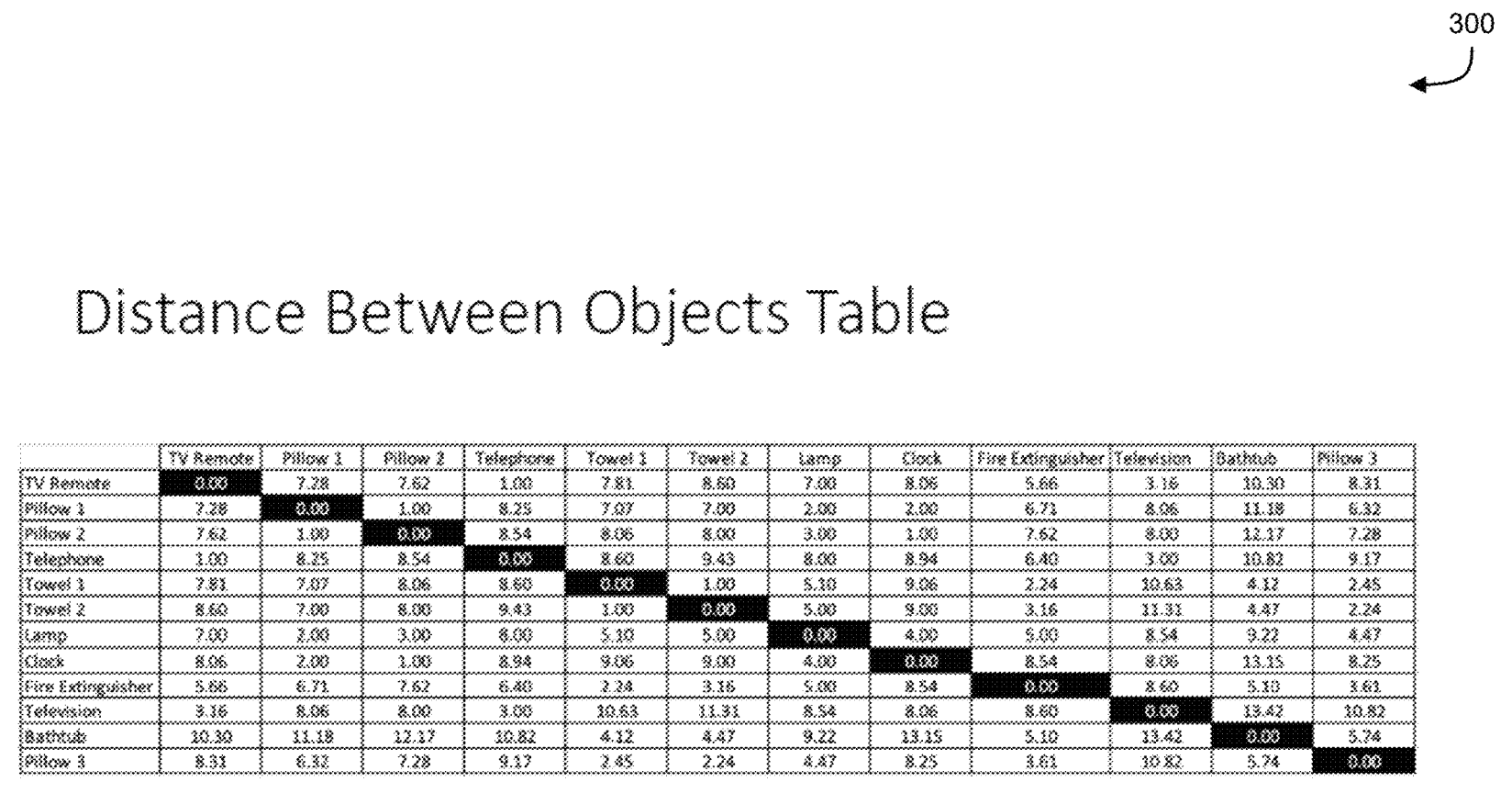

With the objects and positions, in some cases, a table or other data structure 300 may be created to calculate the distance between any 2 unique objects identified in a space, as illustrated in FIG. 3. This calculated distance between any 2 objects in 3D space, in some cases, can be calculated in various examples as $\sqrt{D_{1,2}=(x_1-x_2)^2+(y_1-y_2)^2+(z_1-z_2)^2}$ Where $D_{1,2}$ is the distance between object 1 and object 2, and $x_1$, $x_2$, $y_1$, $y_2$, $z_1$, $z_2$ are the 3D coordinates of the two objects. In some cases, the distance may be relative, in any of a variety of metrics, and may be calculated for a subset or all of the objects for state verification.

Figure 4:
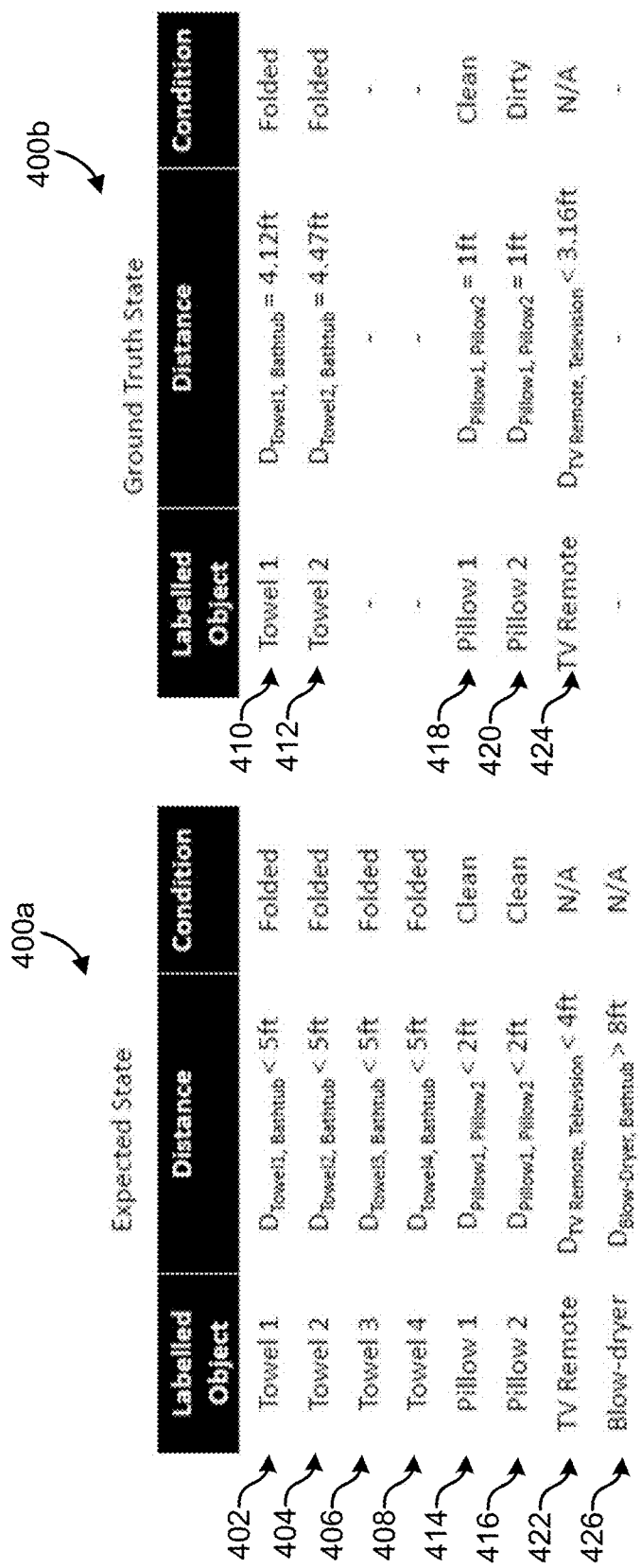
FIG. 4 illustrates example data structures of a desired/expected state and actual states of objects, identified in the example map of FIG. 1, according to at least one embodiment.

Independently from the ground truth room data, a list or set of one or more desired states for a room (e.g., a checklist) can be created—comprising, consisting or consisting essentially of objects (and/or areas of interest), conditions, and locations. Some examples can include may include the following:

1. 4 folded towels located in the within 5 ft of bathtub
2. 2 clean pillows less than 2 ft from one another
3. TV Remote located within 4 ft of the TV
4. 1 blow-dryer anywhere in the room
5. Blow dryer more than 8 ft away from bathtub These desired states can then be compared to the ground truth data created from the room map, such as included in the example 100 and 200 described above in reference to FIGS. 1 and 2. Example data structures or tables of the ground truth states 400b and the corresponding desired states 400a of a number of objects/areas of interest are illustrated in FIG. 4.

In the first example, the desired state is 4 folded towels, represented by row 402, 404, 406, 408, while the scanned room map data shows only 2 unique towels and one of them is unfolded, represented by rows 410, 412. Here, there is a discrepancy in the count of objects and the condition of one of the objects. These discrepancies between the actual state and the desired state can be flagged and some type of correction action initiated to bring the actual state in alignment with the desired state. In the second example, the desired state is of 2 clean pillows less than 2 ft from one another, represented by rows 414, 416. This state will also fail due to one of the pillows (pillow 2) is dirty, as represented by rows 418, 420. These discrepancies between the actual state and the desired state can be flagged.

In the third example, the desired state is one TV Remote is located within 4 ft of the TV, represented by row 422. This is true because there is one (and only one) TV Remote detected, and it is within 4 ft of the TV, via row 424. The actual state matches the desired state of the room, so this checklist item is matched. In the fourth example, the desired state is that one blow-dryer can be anywhere in the room, via row 426. This state will fail because there was no blow-dryer detected in the actual state of the room. Example five shows how this checklist can be used to prevent dangerous situations, such as two objects being close to one another that shouldn't be (e.g., a hair dryer and a bathtub). By repeating this process for more objects, conditions, and locational awareness, in various embodiments many checklist items can be created that can minimize or eliminate the need for a person to physically examine the state of a space.

In some cases, timestamps of the actual state of the recognized objects can also be used in various embodiments. For example, by affirming an object was physically present at one point in time, but missing at a future time, it can provide traceability into when an object may have gone missing. Similarly, this traceability can provide insight into changes into an object's condition: for example, a TV may have a fine condition one day, then broken the next. This traceability can provide a window of time when the condition's state has changed. Likewise, there can be traceability into an object's location—indicating a time window in which an object was moved. For example: On Apr. 11, 2022, at 11:30 am, the TV's condition may be fine. On Apr. 12, 2022, at 11:00 am, the TV's condition is broken. There is a window of time of 23.5 hours where the TV must have been broken. Similarly, the historical data can show when objects appeared, were removed, or location changed.

Figure 5:
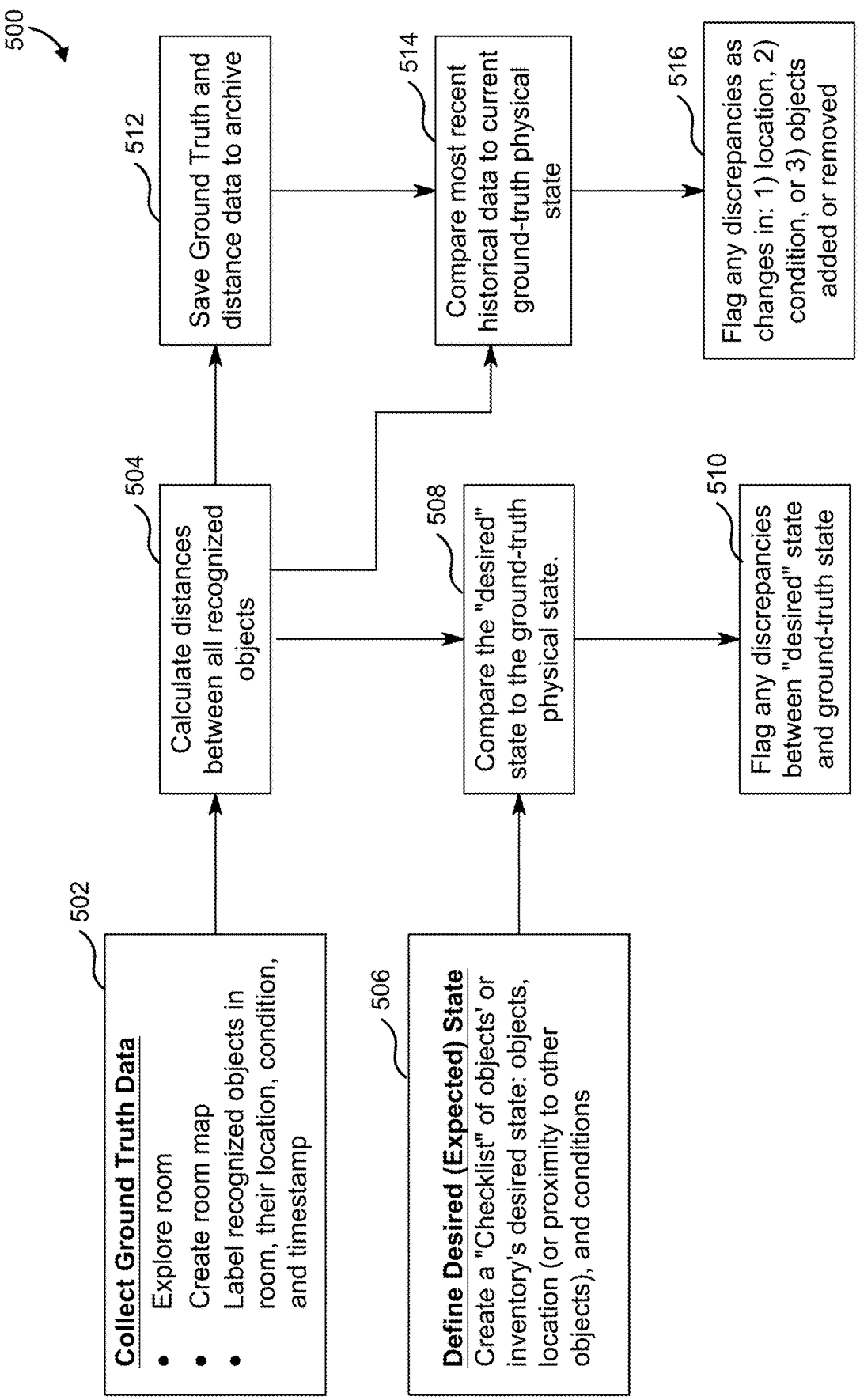
FIG. 5 illustrates an example process for identifying discrepancies in states of objects in a space, according to at least one embodiment.

FIG. 5 illustrate an example process 500 for identifying discrepancies in states of objects in a space. In some aspects, at operation 502, ground truth data of the room is collected. In some aspects, operation 502 may include a robot exploring a room or space, creating a room map, populating the map with labeled recognized objects, number (count) of objects, their location, condition(s) and timestamp. Next, at operation 504, distances may be calculated between some or all unique objects and stored in a table.

In some cases, independently of operations 502 and 504, a desired (or expected) state of the space may be defined or obtained. In some cases, this may be a list of inventory: objects, conditions, and locations. The ground truth data collected operations 502 and/or 504 can be compared against the desired/expected state obtained in operation 506 This can include objects (are the correct items present, and none of the incorrect items), count of objects (are there more or less of an item present than desired), location and proximity (are objects in the correct location, or in correct proximity to other items), and condition (are items in proper condition—not broken, dirty, toilet seat up, etc.). Any discrepancies between the ground truth state and the desired (expected) state can be flagged for notification, or other action, at operation 510.

In some cases, historical ground truth data is saved/archived for historical tracking and later use, such as at operation 512. In some cases, the most recent historical ground truth data is compared to current ground truth data, at operation 514. This can be similar to operation 508, except this can be a historical comparison, rather than a desired state comparison. This can include objects (have the objects in the room changed), count of objects (have the number of objects changed), location and proximity (have objects been moved), and condition (has the condition of objects changed—TV broken, towels dirty or unfolded, etc.). Any historical data discrepancies between previous and current states may then be flagged, at operation 516.

While the examples described above cover use-cases for an indoor room, the same approach of checking the inventory and location of objects can help provide answers in similar situations including hospitals and retail stores (and others). Some examples can include: has a machine in a hospital room gone missing, is there an extra machine in another room (implying that the machine was moved to another room), has the layout of a room changed (maybe someone moved a chair to a different location), and so on.

Figure 6:
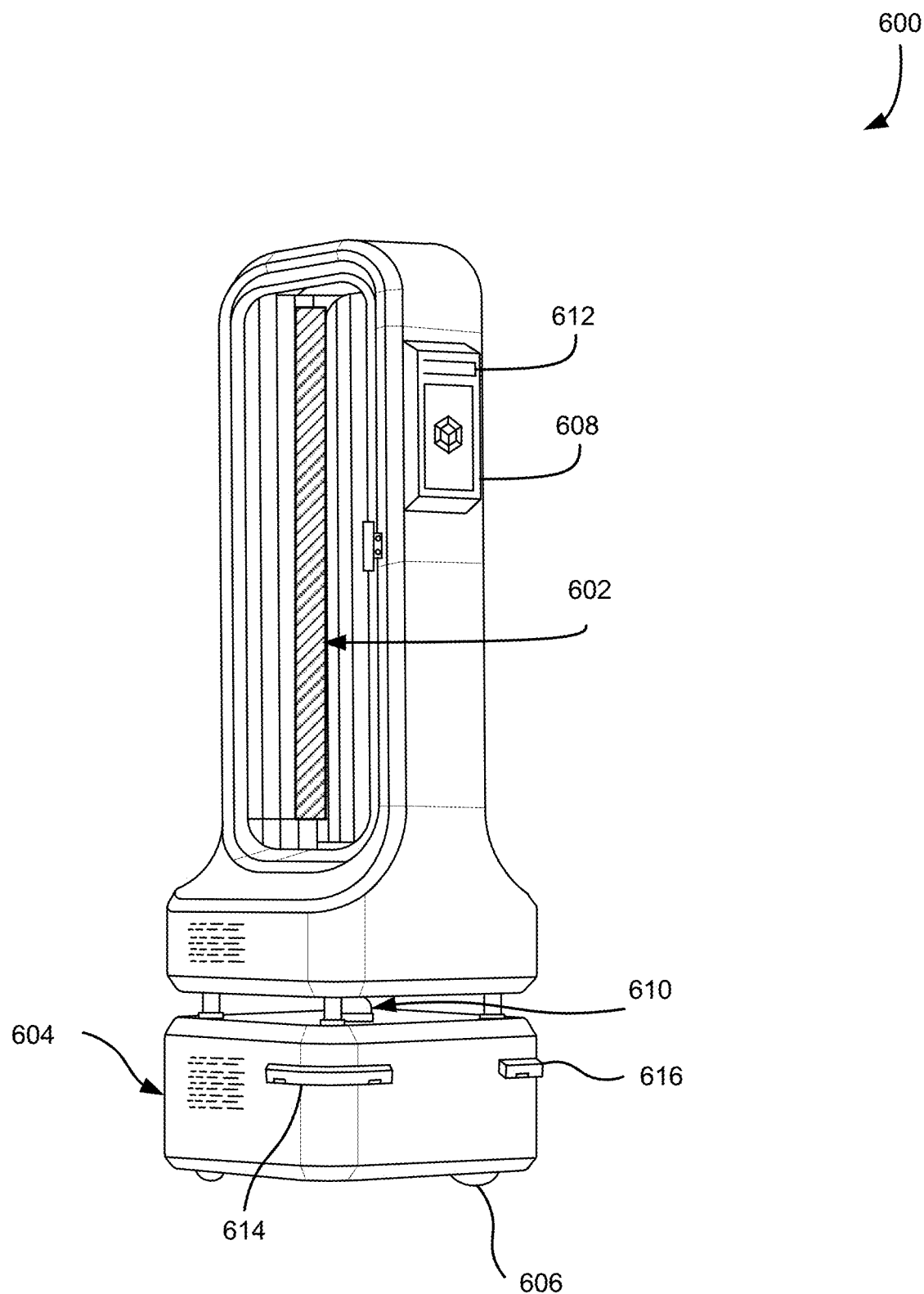
FIG. 6 illustrates an example of an autonomous device for determining states of objects, according to at least one embodiment.

FIG. 6 illustrates an example schematic 600 of an autonomous device or mobile mapping 600 including hardware components. In various examples, the mobile device 600 (also referred to herein as a robot or autonomous vehicle), may include various components to enable motion, steering, speed control, etc., and various other motion controls, such as may form base unit or autonomous vehicle unit 604. Various definitions of robot or autonomous vehicle can include some type of propulsion device such as a motor which may be powered by a power source, including any of a variety of battery technology, run on various types of fuels, including gasoline, diesel, propane, and various other types of fuels depending on application. In some cases, the robot or autonomous vehicle may also include any of a number of wheels 606 (e.g., 1, 2, 3, 4, 5 etc.) made of various materials, a chassis or frame (made of any of a variety of materials including plastics, composites, metals, etc.), a battery or other power source, and/or one or more implementations of a computing device 608.

In some cases, the computing device 608 may include one or more memory devices, one or more processors or CPUs, various network connectivity devices, such as Wi-Fi, Bluetooth, etc., and various other components to facilitate the mobile device 600 to execute route planning, route execution, operate one or more UV lamp devices, operate one or more sensor devices, and communicate with one or more back-end services to provide reports and/or remote control of the mobile device 600. In some cases, the computing device or devices may be placed on one or more logic boards, chips, etc. In some implementations, the computing device 608 may include one or more of a CPU, GPU, memory, wireless internet, Bluetooth, inputs (e.g., USB), etc. In some cases, the memory of the computing device 608 may include a computer readable medium that stores instructions (e.g., software) that when executed configures the robot to perform one or more of the functionalities, methods, or the like, described herein.

In some aspects, mobile device 600 may include various sensors, in communication with computing device 608. In some cases, the one or more sensors may include one or more of the following: one or more lidar sensors 610, one or more cameras 612, one or more proximity sensors 614, one or more cliff sensors 616, one or more sonar sensors (not illustrated), and various other sensors that may be used to identify objects proximate to mobile device 600 and/or determine and safely execute a route for mobile device 600 to travel. In some cases, the output of the one or more sensors can be used as inputs to build a map of the room or space and detect the presence and/or distance of other objects and obstacles. These obstacles in various examples can include the presence of static objects (e.g., walls, chairs, tables), dynamic objects (people, animals, other robots, etc.), or the absence of a physical object (e.g., a step or other hole in the ground). In some cases, the detection of one or more moving objects (e.g., people, animals, other machinery, etc.), may trigger stopping motion of the mobile unit 600. In some cases, the one or more camera devices 612 may include one or more digital video cameras (e.g., 2D/3D) which can be used to capture images of the physical space around the robot or for other suitable purposes. In some cases, the one or more sensors of mobile device 600 may also detect one or more conditions of one or more objects and determine the location of various detected objects, such as using any of a variety of SLAM techniques.

In some aspects, one or more operations or processes involved in generating a map of a space, detecting states of objects/areas of interest within that space, and comparing those states to one or more desired or expected states for the mobile device 600 may be performed locally via the computing device or system 608 of the device 600. In yet other aspects, one or more of these operations or processes may be performed by remote computing resources, such as may communicate with the mobile device 600 via one or more networks. In some aspects, the remote computing resources may include servers and/or other hardware devise, cloud computing resources, such as virtual machine and/or software containers/isolated execution environments, provided by a checklist service or third party provider, such as a computing resource service provider (e.g., Amazon Web Services, Microsoft Azure, etc.). In some cases, the resource intensive tasks may be performed by the remote computing resources to converse power and/or reduce complexity of the mobile device 600.

Figure 7:
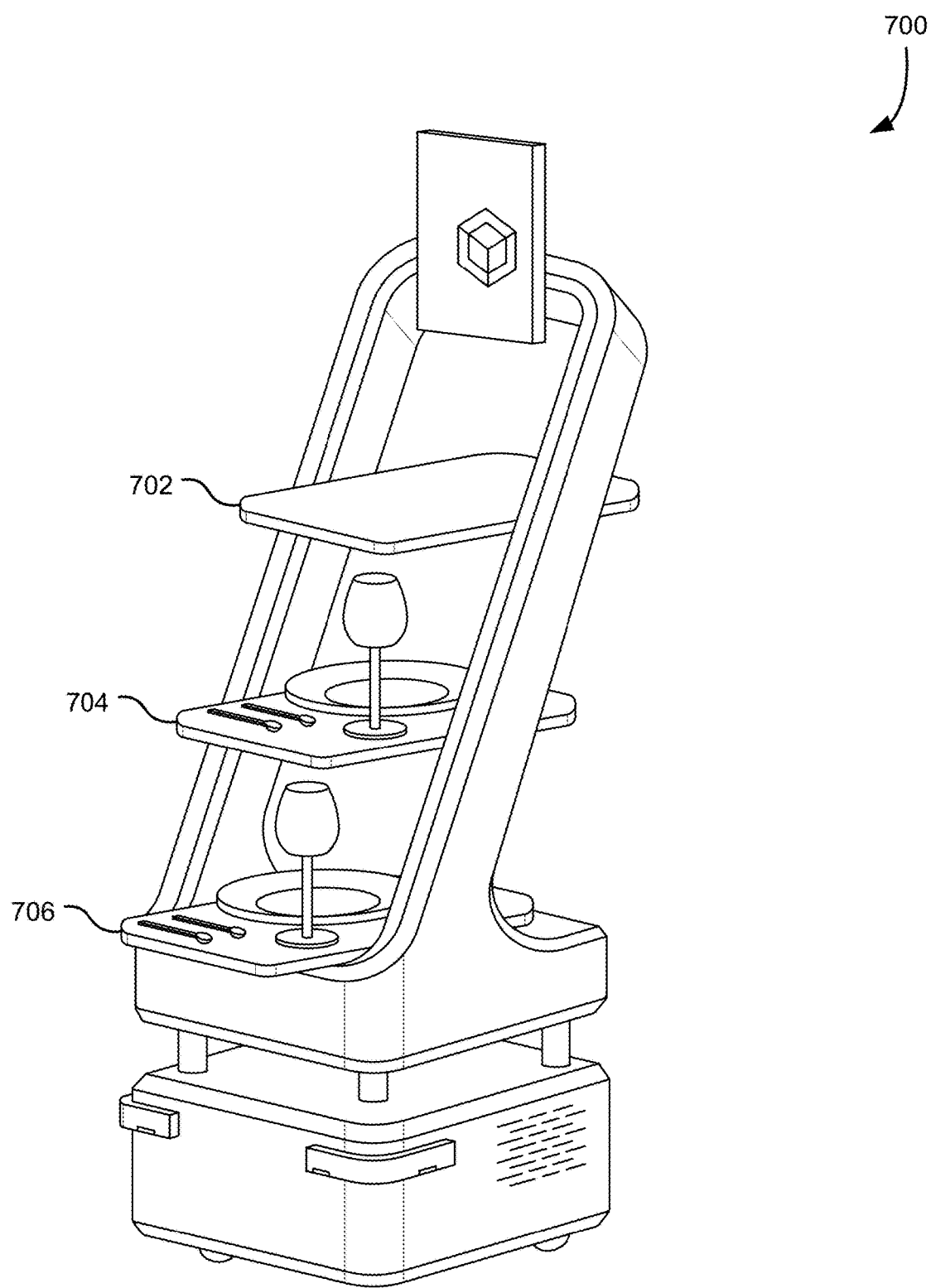
FIGS. 7 and 8 illustrate other examples of an autonomous device for determining states of objects, according to at least one embodiment.
Figure 8:
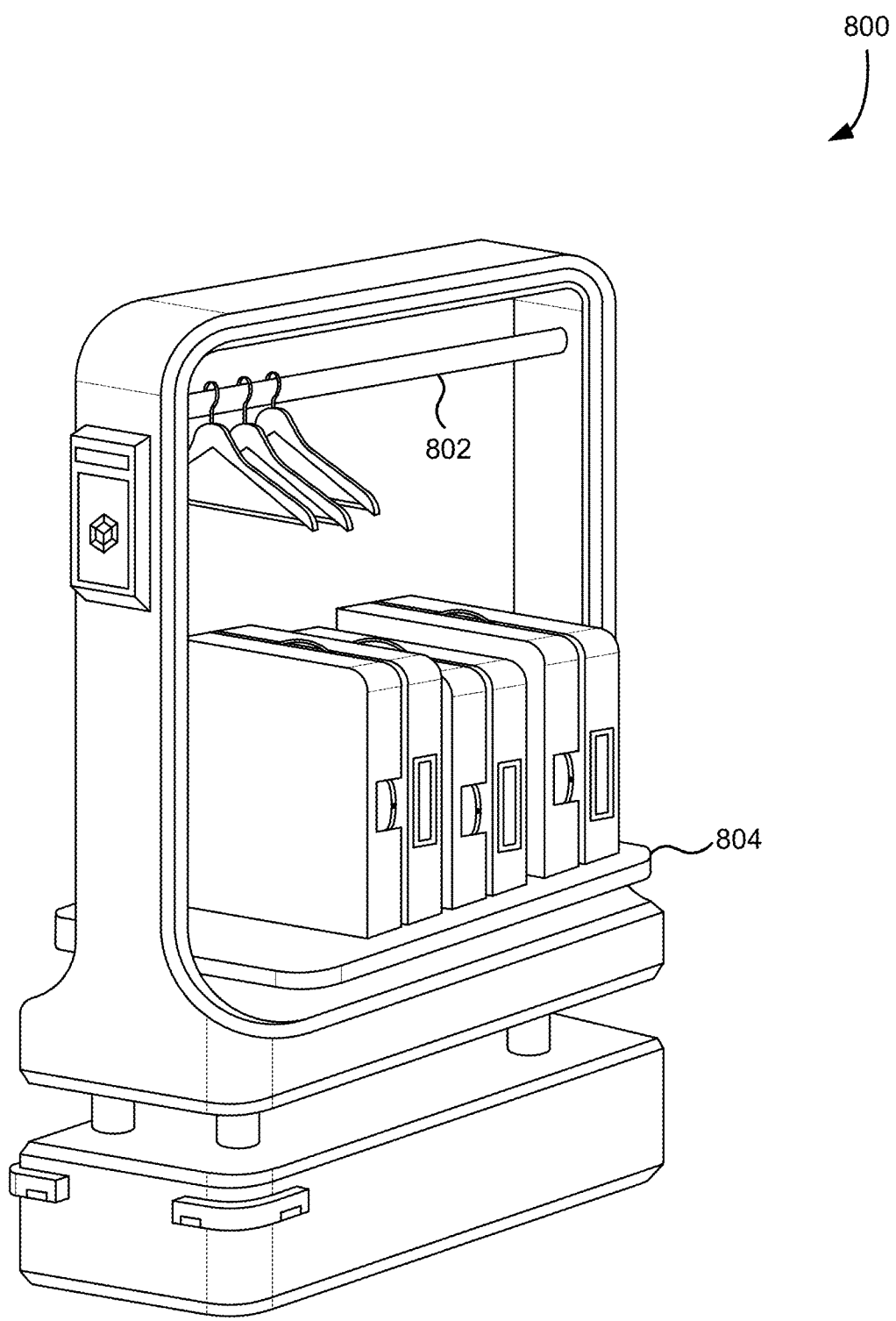

In some examples, mobile device 600 may have other devices to provide additional functionality, such as one or more UV lamps or other disinfecting devices 602 to provide for disinfecting services to various spaces. FIGS. 7 and 8 illustrate other examples 700 and 800 of autonomous devices that may be utilized to determine states of objects, in addition to providing other functionality. As illustrated, device 700 may include a number of trays or substantially flat surfaces 702, 704, 706 for holding items, such as dishware, to be used in restaurants for cleaning and/or resetting tables. In some cases, device 700 may also be utilized for moving inventory items in a retail environment, and for various other purposes and in various other situations and applications. Device 800 may provide for luggage moving functionality, such as through one or more hanging racks or bars 802, and one or more platforms for holding luggage and other items.

Figure 9A:
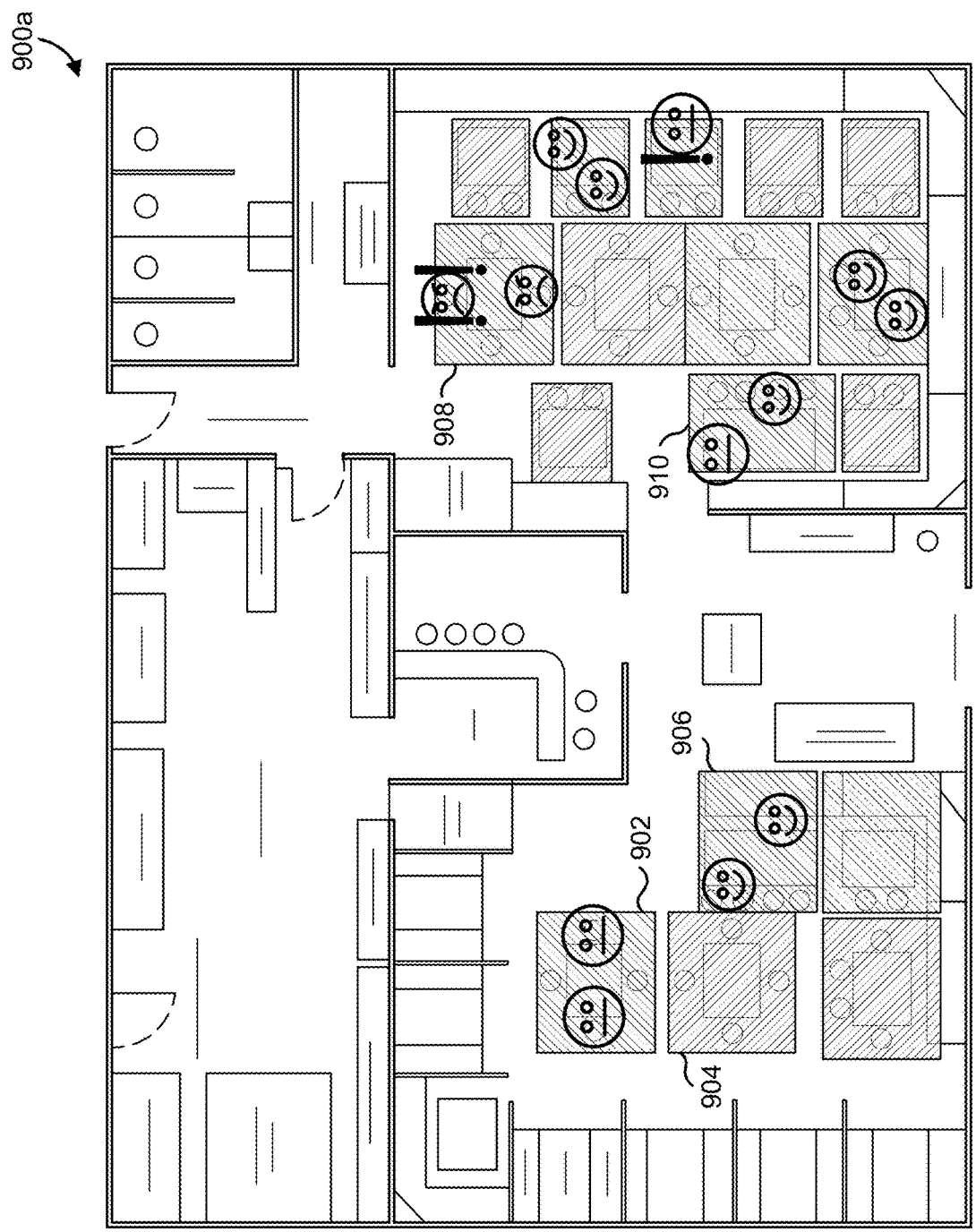
FIGS. 9A and 9B illustrate an example map and corresponding user interface relating to states of objects in a restaurant space, according to at least one embodiment.
Figure 9B:
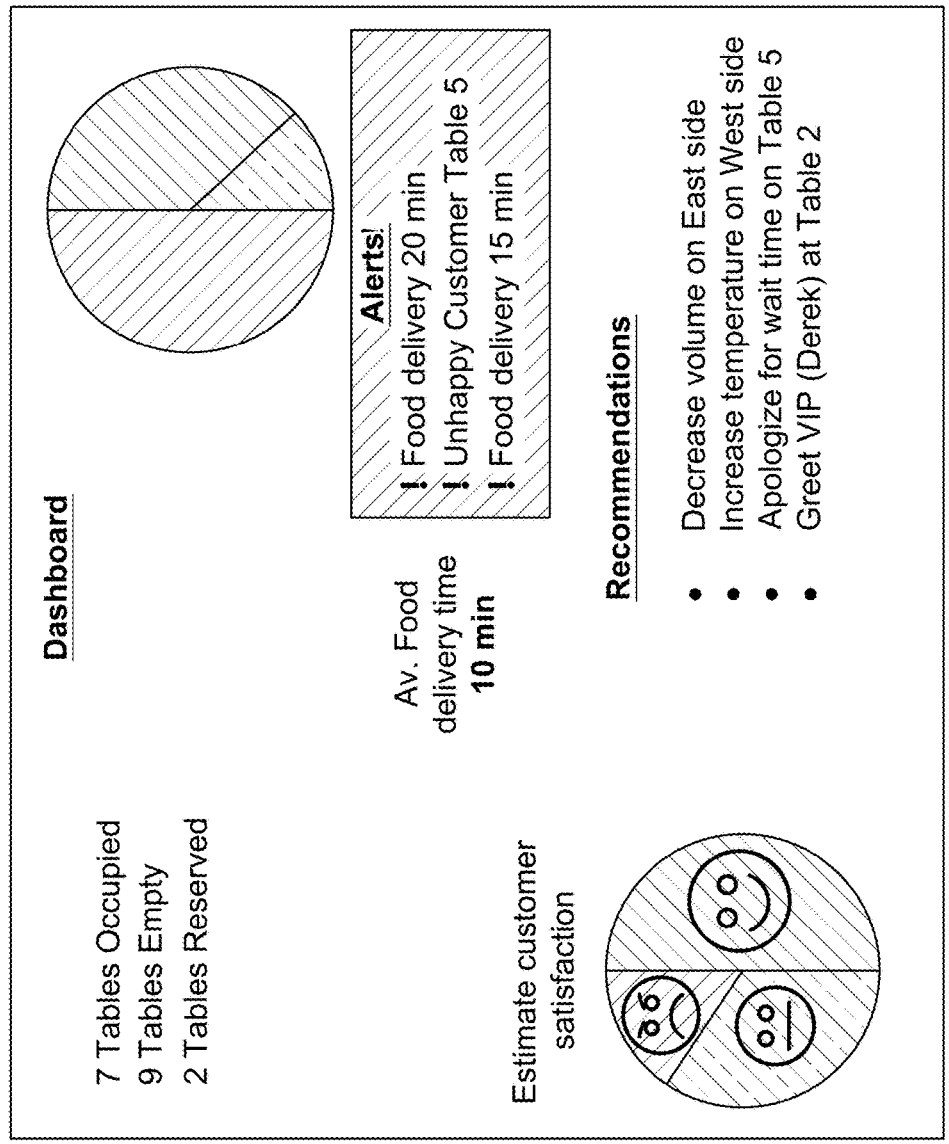

FIGS. 9A and 9B illustrate an example map 900a and corresponding user interface 900b relating to states of objects in a restaurant space. In some cases, a described autonomous device may travel within an interior space and create a map (or data structure that may be represented by a map but may not actually include a map), such as map 900a, which may depict the outline of a restaurant space including tables and seating areas 902, 904, 906, 908, and 910. Using the described techniques, the autonomous device may detect and label these seating areas or tables (e.g., uniquely, such as table 1, table 2, etc.) as empty, reserved (e.g., accessing a reservation system of the restaurant) or full. In some cases, the autonomous device may detect how many people are at a given table, and indicate a number of people as a condition of the able/seating area. In yet some examples, the autonomous device may detect various attributes of the people sitting in various seating areas as another condition, such happy or content (e.g., smiling, laughing, eating and talking, illustrated as a smiley face), indifferent or neutral (e.g., quietly eating, illustrated as a neutral face), unhappy (e.g., looking impatient, or with a scowl on their face, illustrated by a frown face), or very unhappy/agitated (e.g., speaking in a raised voice, using words indicative of dissatisfaction or anger, illustrated as an unhappy face with an exclamation mark). It should be appreciated that the specific details of FIG. 9A are only given by way of example, and that various other ways to label objects and conditions of those objects, including other numbers of classifications/conditions, other types of classifications/conditions, and the like, are contemplated herein.

FIG. 9B illustrates an example graphical user interface or dashboard 900b for summarizing the information represented in map 900a, such as may be displayed on a computing device, such as may be used by a manager or employee of a restaurant, to aid the employee in better managing and improving customer satisfaction in the restaurant.

Figure 10:
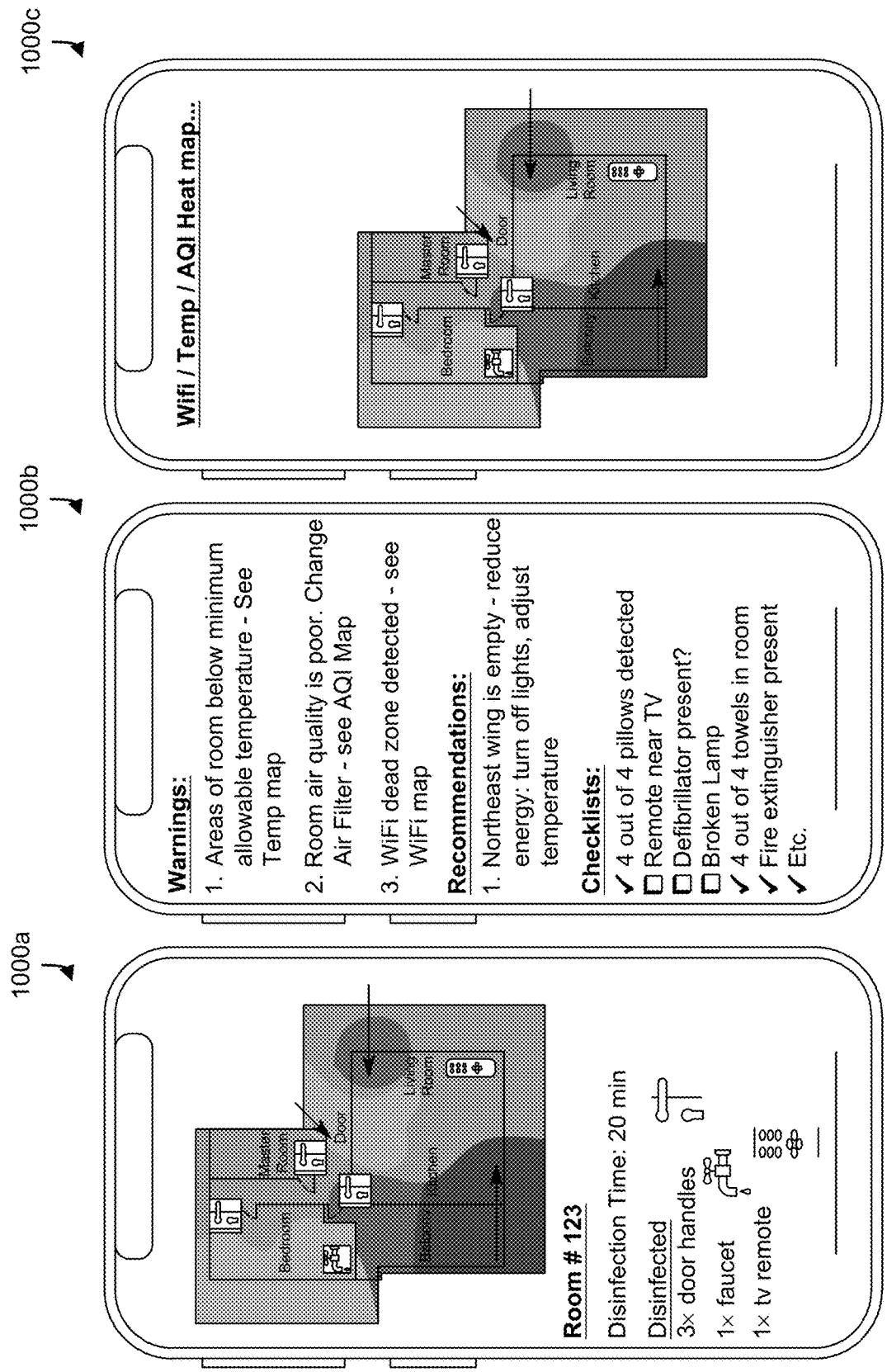
FIG. 10 illustrates example views of a graphical user interface for representing object state comparison of a space, according to at least one embodiment.

FIG. 10 illustrates example views 1000a, 1000b, and 1000c of a graphical user interface for representing object state comparisons of a space, such as may be generated by the autonomous device descried above, using the described techniques. As illustrated, view 1000a, a map of a living quarters may be generated a displayed, with information pertaining to states of disinfection of various objects in the living quarters. View 1000b illustrates an example textual representations of states of various objects in a hotel room, for example, including warnings of various states of objects or areas of the room, recommendations of corrective actions, and a checklist containing indications of whether the condition/location of certain objects satisfy a given checklist. View 1000c illustrates a more detailed view of the map representing illustrated in view 1000a.

Figure 11:
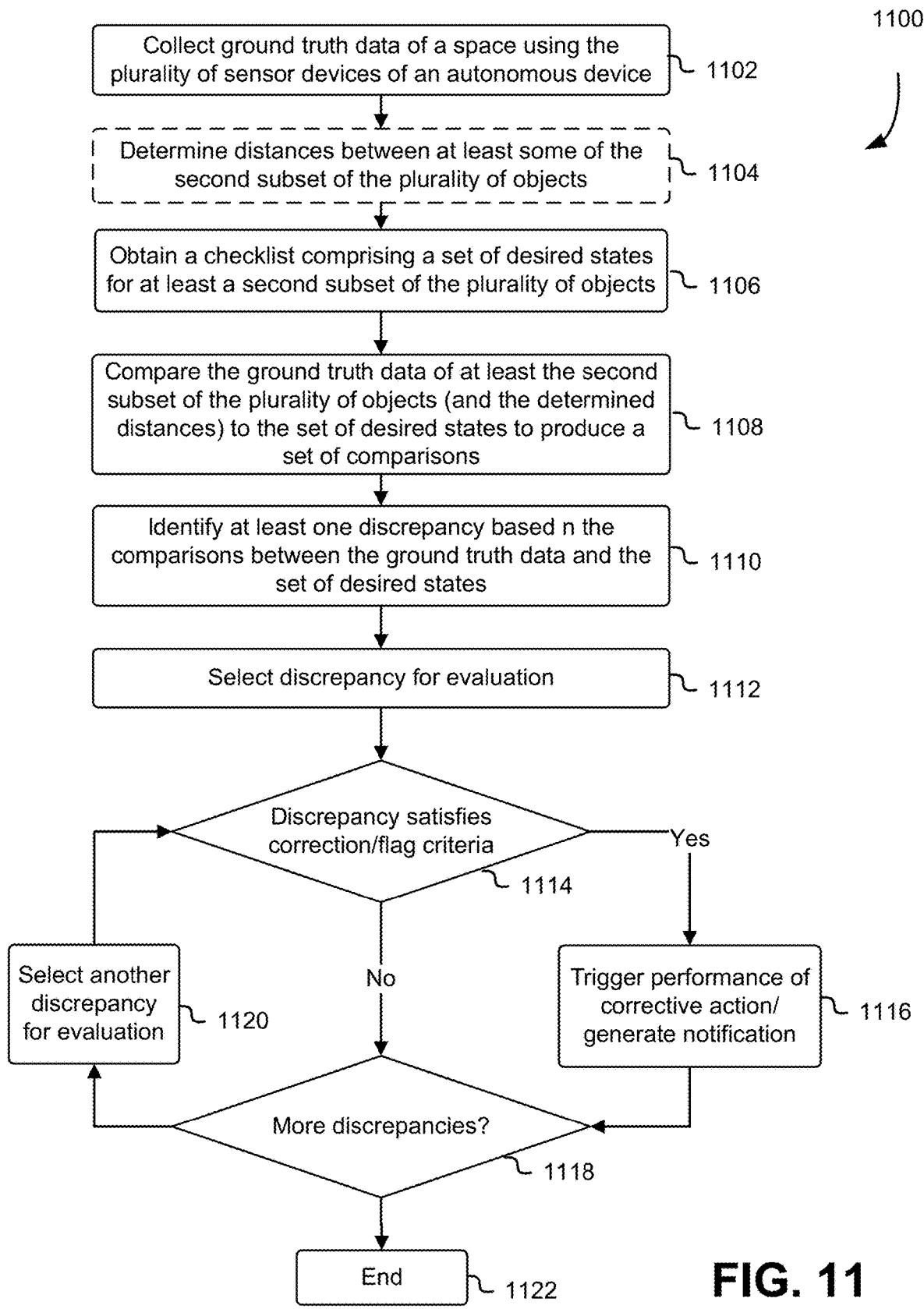
FIG. 11 illustrates other example processes for identifying discrepancies in states of objects in a space, according to at least one embodiment.

FIG. 11 illustrates an example process 1100 for determining and comparing states of objects in a space, such as may be performed by any of the autonomous devices 600-800, described above in reference to FIGS. 6-8. In some cases, one or more operations of process 1100 may generate and/or utilize one or more of map 100, or tables or data structures 200, 300, 400a and/or 400b described above in reference to FIGS. 1-4. In some cases, process 1200 may generate one or more of map 100 and/or 900z, and/or user interfaces 900b and/or 1000, as described above in reference to FIGS. 1, 9A, 9B, and 10. As illustrated in FIG. 11, dotted or dashed lines may indicate optional operations, such that process 1300 may be performed with or without the so indicated operations.

In some aspects, process may begin at operation 1102, where ground truth data of one or more objects in a space may be collected using the plurality of sensor devices of an autonomous device, such as any of autonomous devices 600-800 described above in reference to FIGS. 6-8. In some cases, operation 1102 may include collecting data via one or more camera devices, lidar sensors, sonar sensors, cliff sensors, audio sensors, and the like. The ground truth data may include locations of objects and one or more conditions associated with at least some of the objects. In some cases, operation 1102 may include associating timestamp information with detected states of individual objects of the one or more of objects.

Next in some optional implementations, one or more distances between at least some of the second subset of the plurality of objects may be determined, such as via various methods, such as those described above in reference to FIG. 3, at operation 1104.

At operation 1106, a checklist including a set of desired states for at least a second subset of the plurality of objects may be obtained, such as from a customer based system or manually generated and provided to the described system/device. The checklist may include any a variety of data fields for a number of different objects/areas of interest, such as described above in reference to FIG. 4. In some cases, a desired state of an object may include a maximum or minimum distance between the object and another object (or basically any feature that is detectable within the space).

At operation 1108, the ground truth data of at least the second subset of the plurality of objects (and the determined distances in some optional cases) may be compared to the set of desired states to produce a set of comparisons.

At operation 1110, at least one discrepancy may be identified based on the comparisons between the ground truth data and the set of desired states. In some aspects, the set of comparisons may produce one or more discrepancies between a desired state of an object/area of interest and an expected or desired state of the object/area of interest. In some cases, as described above in reference to FIG. 4, the discrepancy or discrepancies may be based on relative distances between objects/other identifiable objects, locations, etc. within or proximate to the space.

In some cases, such as when there is more than one discrepancy identified, a first discrepancy may be selected for evaluation, at operation 1112. At operation 1114, the discrepancy may be compared to a correction/flagging criteria. If the discrepancy meets or exceed the correction criteria, a notification may be generated and/or the performance of a corrective action may be triggered, at operation 1116. After performance of operation 1116, or upon determining that the discrepancy does not satisfy the correction criteria at operation 1114, process 1100 may proceed to operation 1118, in which it may be determined if any more discrepancies have been identified (that has not been analyzed). If yes, the un-analyzed discrepancy may be selected at operation 1120, and process 1100 may loop back through operations 1114, 1116, 1118, and/or operations 1120, until no more discrepancies are present, at which point, process 1100 may end at 1122.

In some cases, the correction criteria may be based on a number of objects detected in the space. In one example, if the number of expected items or objects is greater than a threshold difference to an expected or desired number of objects, the correction criteria may be deemed satisfied (e.g., only 2 towels were detected when the desired state indicated 4 towels should be present, and the threshold difference is 0 or 1 towel). In another example, the correction criteria may be based on one or more conditions associated with an object or objects (e.g., folded towel versus unfolded towel, or dirty towel versus clean towel). In yet another example, the correction criteria may be based on or include a distance of one object from another object or identifiable area or object (e.g., the TV remote is greater than 5 feet from the TV). It should be appreciated that the described correction criteria are only given by way of example, and that various other correction criteria based on any of a number of factors relating to or derivable from a detectable attribute of one or more objects/areas of interest are contemplated herein.

In some aspects, process 1100 may additionally or alternatively include comparing the ground truth data of at least the second subset of the plurality of objects to historical ground truth data associated with at least the second subset of the plurality of objects to identify at least one second discrepancy; determining that the at least one second discrepancy satisfies the criteria for correction; and triggering based on the determining, a second corrective action to be performed to correct the at least one second discrepancy.

In some cases, process 1100 may additionally or alternatively include generating a map representation of the space including locations and conditions of at least the second subset of the plurality of objects. In some cases, process 1100 may additionally or alternatively include generating a graphical user interface representing the ground truth data and the at least one discrepancy. In this implementations, a notification or some type of trigger that initiates a corrective action to be performed may be generated within the graphical user interface. In other cases, the notification/corrective action may be triggered or sent to a device or account registered or associated with the described system (e.g., via SMS message, email, chat message, etc.).

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, in some embodiments, elements that are specifically shown in some embodiments can be explicitly absent from further embodiments. Accordingly, the recitation of an element being present in one example should be construed to support some embodiments where such an element is explicitly absent.

What is claimed is:

1. A mobile autonomous device comprising:
   an autonomous vehicle unit comprising a propulsion system;
   a plurality of sensor devices comprising at least a camera device;
   at least one processor; and
   memory that stores computer-executable instructions that, as a result of being executed by the one or more processors, cause the mobile autonomous device to:
   collect ground truth data of a space using the plurality of sensor devices, the ground truth data comprising information identifying a plurality of objects each associated with a location in the space, and a condition associated with at least a first subset of the plurality of objects;
   determine distances between at least some of the second subset of the plurality of objects;
   obtain a checklist comprising a set of desired states for at least a second subset of the plurality of objects;

compare the ground truth data of at least the second subset of the plurality of objects and the determined distances to the set of desired states to produce a set of comparisons, individual comparisons of the set of comparisons identifying discrepancies between the ground truth data of a first object of the second subset of the plurality of objects and the desired state of the first objects;

determine that at least one discrepancy of the set of comparisons satisfies a criteria for correction; and trigger, based on the determining, a corrective action to be performed to correct the at least one discrepancy.

2. The mobile autonomous device of claim 1, wherein the desired state of the first object comprises a maximum or minimum distance between the first object and a second object.

3. The mobile autonomous device of claim 1, wherein the computer-executable instructions further include instructions that further cause the mobile autonomous device to:

compare the ground truth data of at least the second subset of the plurality of objects to historical ground truth data associated with at least the second subset of the plurality of objects to identify at least one second discrepancy;

determine that the at least one second discrepancy satisfies the criteria for correction; and trigger, based on the determining, a second corrective action to be performed to correct the at least one second discrepancy.

4. The mobile autonomous device of claim 1, wherein the computer-executable instructions further include instructions that further cause the mobile autonomous device to:

associate timestamp information with individual objects of the plurality of objects.

5. The mobile autonomous device of claim 1, wherein the computer-executable instructions further include instructions that further cause the mobile autonomous device to:

generate a map representation of the space including locations and conditions of at least the second subset of the plurality of objects.

6. The mobile autonomous device of claim 1, wherein the computer-executable instructions further include instructions that further cause the mobile autonomous device to:

generate a graphical user interface representing the ground truth data and the at least tone discrepancy.

7. The mobile autonomous device of claim 1, wherein the spaces comprises at least one of a hotel room, a retail space, or a restaurant.

8. A computer-implemented method comprising:

collecting, by an autonomous robot comprising at least two sensors, ground truth data of a space, the ground truth data comprising: information identifying a plurality of objects each associated with a location in the space, and a condition associated with at least a first subset of the plurality of objects;

obtaining a checklist comprising a set of desired states for at least a second subset of the plurality of objects;

comparing the ground truth data of at least the second subset of the plurality of objects to the set of desired states to produce a set of comparisons, individual comparisons of the set of comparisons identifying discrepancies between the ground truth data of a first object of the second subset of the plurality of objects and the desired state of the first object;

determining that at least one discrepancy of the set of comparisons satisfies a criteria for correction; and generating, based on the determining, a notification indicating the at least one discrepancy.

9. The computer-implemented method of claim 8, wherein collecting the ground truth data of the space further comprises generating a map of the space.

10. The computer-implemented method of claim 8, further comprising determining distances between at least some of the second subset of the plurality of objects, wherein the distance comprises part of the ground truth data, and wherein the set of desired states comprise the distances.

11. The computer-implemented method of claim 10, wherein the desired state of the first object comprises a maximum or minimum distance between the first object and a second object.

12. The computer-implemented method of claim 8, further comprising:

comparing the ground truth data of at least the second subset of the plurality of objects to historical ground truth data associated with at least the second subset of the plurality of objects to identify at least one second discrepancy;

determining that the at least one second discrepancy satisfies the criteria for correction; and triggering, based on the determining, a second corrective action to be performed to correct the at least one second discrepancy.

13. The computer-implemented method of claim 8, wherein the space comprises an interior space.

14. The computer-implemented method of claim 8, further comprising:

associating timestamp information with individual objects of the plurality of objects.

15. The computer-implemented method of claim 8, further comprising:

generating a graphical user interface representing the ground truth data and the at least one discrepancy.

16. The computer-implemented method of claim 8, wherein the notification is generated within a graphical user interface.

17. A non-transitory computer-readable storage medium storing thereon executable instructions that, as a result of being executed by one or more processors of a computer system, cause the computer system to at least:

collect, by an autonomous robot comprising at least two sensors, ground truth data of a space, the ground truth data comprising: information identifying a plurality of objects each associated with a location in the space, and a condition associated with at least a first subset of the plurality of objects;

obtain a checklist comprising a set of desired states for at least a second subset of the plurality of objects;

compare the ground truth data of at least the second subset of the plurality of objects to the set of desired states to produce a set of comparisons, individual comparisons of the set of comparisons identifying discrepancies between the ground truth data of a first object of the second subset of the plurality of objects and the desired state of the first objects;

determine that at least one discrepancy of the set of comparisons satisfies a criteria for correction; and trigger, based on the determining, a corrective action to be performed to address the at least one discrepancy.

18. The non-transitory computer-readable storage medium of claim 17, wherein the instructions further comprise instructions that, as a result of being executed by the one or more processors, cause the computer system to:

determine distances between at least some of the second subset of the plurality of objects, wherein the distance comprises part of the ground truth data, and wherein the set of desired states comprise the distances.

19. The non-transitory computer-readable storage medium of claim 18, wherein the desired state of the first object comprises a maximum or minimum distance between the first object and a second object.

20. The non-transitory computer-readable storage medium of claim 17, wherein the instructions further comprise instructions that, as a result of being executed by the one or more processors, cause the computer system to:
   compare the ground truth data of at least the second subset of the plurality of objects to historical ground truth data associated with at least the second subset of the plurality of objects to identify at least one second discrepancy;
   determine that the at least one second discrepancy satisfies the criteria for correction; and
   trigger, based on the determining, the first corrective action or a second corrective action to be performed to correct the at least one second discrepancy.

* * * * *